United States Patent
Larsen

(10) Patent No.: US 10,365,176 B2
(45) Date of Patent: Jul. 30, 2019

(54) WIRELESS MEASUREMENT OF INFLATABLE PRESSURE

(71) Applicant: Christopher Scott Larsen, Plymouth, MN (US)

(72) Inventor: Christopher Scott Larsen, Plymouth, MN (US)

( * ) Notice: Subject to any disclaimer, the term of this patent is extended or adjusted under 35 U.S.C. 154(b) by 36 days.

(21) Appl. No.: 15/360,968

(22) Filed: Nov. 23, 2016

(65) Prior Publication Data
US 2017/0160156 A1 Jun. 8, 2017

Related U.S. Application Data

(60) Provisional application No. 62/262,328, filed on Dec. 2, 2015.

(51) Int. Cl.
| | |
|---|---|
| *G01L 17/00* | (2006.01) |
| *G01L 15/00* | (2006.01) |
| *H04B 5/00* | (2006.01) |
| *B60C 23/04* | (2006.01) |
| *G01L 19/08* | (2006.01) |

(52) U.S. Cl.
CPC .......... *G01L 17/00* (2013.01); *B60C 23/0433* (2013.01); *G01L 15/00* (2013.01); *G01L 19/086* (2013.01); *H04B 5/0043* (2013.01); *H04B 5/0062* (2013.01); *A63B 2220/56* (2013.01); *A63B 2220/833* (2013.01); *A63B 2225/54* (2013.01)

(58) Field of Classification Search
CPC .... G01L 17/00; G01L 17/005; A63B 2220/56
See application file for complete search history.

(56) References Cited

U.S. PATENT DOCUMENTS

| | | | | |
|---|---|---|---|---|
| 5,755,634 A | * | 5/1998 | Huang | A63B 43/00 473/570 |
| 2001/0004236 A1 | * | 6/2001 | Letkomiller | B60C 23/0408 340/572.1 |
| 2009/0058667 A1 | * | 3/2009 | Dixon | B60C 23/0452 340/626 |
| 2013/0076536 A1 | * | 3/2013 | Nakatani | G08C 17/02 340/870.02 |
| 2014/0150561 A1 | * | 6/2014 | Richardson | G01L 19/086 73/753 |
| 2014/0194232 A1 | * | 7/2014 | Krysiak | A63B 43/06 473/570 |
| 2014/0305360 A1 | * | 10/2014 | Yamada | B63B 59/02 114/219 |
| 2015/0059461 A1 | * | 3/2015 | Ingram | B60C 23/0449 73/146.5 |
| 2016/0332493 A1 | * | 11/2016 | Atsumi | B60C 23/0452 |
| 2016/0375730 A1 | * | 12/2016 | Kona | B60C 23/003 141/4 |
| 2017/0059435 A1 | * | 3/2017 | Marques | B60C 23/0483 |
| 2017/0100644 A1 | * | 4/2017 | Monari | A63B 43/004 |

FOREIGN PATENT DOCUMENTS

FR 2572029 A1 * 4/1986 ......... B60C 23/0428

* cited by examiner

*Primary Examiner* — Daniel J Colilla

(57) ABSTRACT

A pressure test method, device, and system of using the same are described herein. One method includes an inflatable with an internally mounted pressure sensor assembly, measuring pressure values, associating the sensor to an identification reader to receive the pressure values from the pressure sensor, and notifying a user of the measured pressure.

16 Claims, 4 Drawing Sheets

WIRELESS MEASUREMENT OF INFLATABLE PRESSURE

RELATED APPLICATION

This application claims priority to U.S. Provisional Application Ser. No. 62/262,328 (entitled Wireless measurement of inflatable pressure, filed Dec. 2, 2015) which is incorporated herein by reference.

TECHNICAL FIELD

The present disclosure relates to a method of measuring, recording, and tracking pressure in an inflatable device such as a ball or tire, and devices and systems of using the same.

BACKGROUND

Previous approaches to measure pressure inside an inflatable device such as a tire are generally performed by invasive means such as attaching a pressure gauge to a valve or needle that provides physical access to the pressure inside the inflatable.

Previous approaches break the pressure of the device and can result in significant loss in pressure during the measurement itself, resulting in uncertainty in internal pressure. Some pressure gauges also measure through the physical movement of a scale within the gauge (e.g. a sliding ruler). As debris builds up in the physical mechanism, the reported pressure can vary significantly.

Previous approaches require physical access to a valve point and a physical gauge.

Previous approaches generally do not allow tracking of test results to monitor for slow leaks or even for deliberate misreporting of temperature. This can result in frequent known and/or unknown misuse or non-use among the users, which may, result in different pressure than expected.

DETAILED DESCRIPTION

Figure 1:
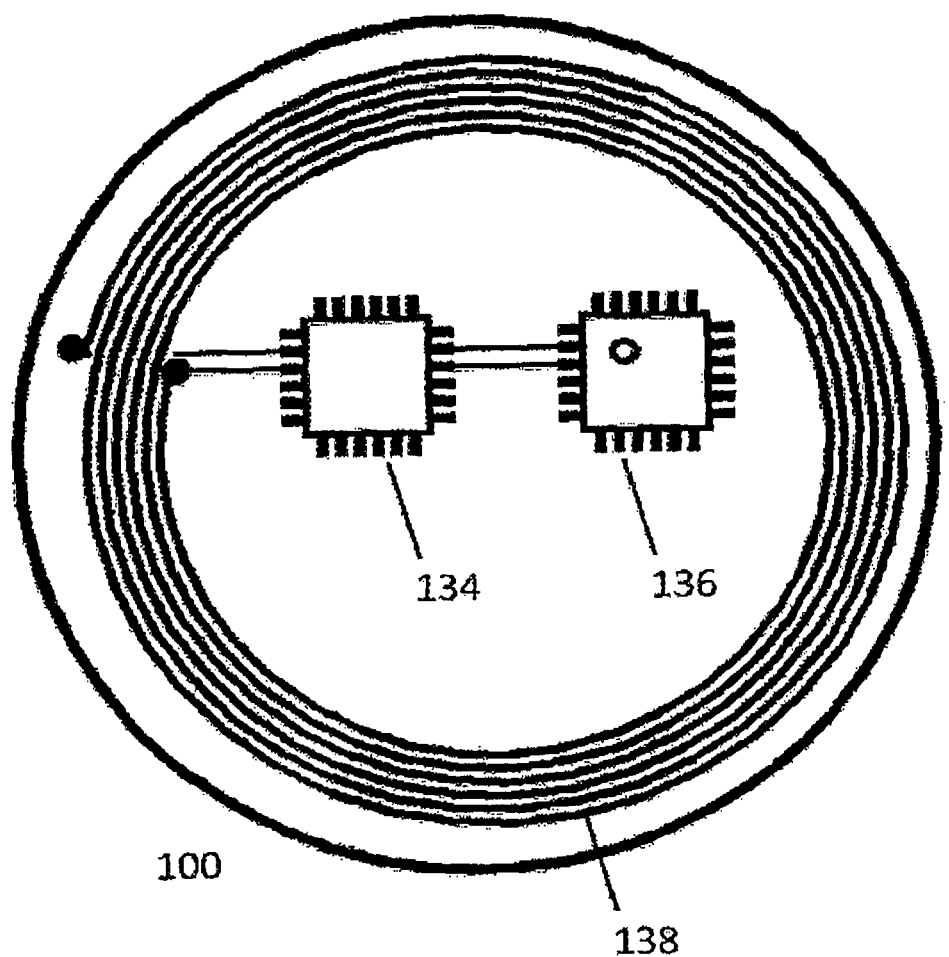
FIG. 1 illustrates a sensor according to an embodiment of the present disclosure.

A pressure test method, device, and system of using the same are described herein. For example, one or more embodiments includes an inflatable with an internally mounted pressure sensor assembly, measuring pressure values, associating the sensor to an identification reader to receive the pressure values from the pressure sensor, and notifying a user of the measured pressure.

Testing a pressure in accordance with embodiments of the present disclosure can test a pressure within an inflatable vessel. As a result, the effect on pressure of changes in conditions (e.g. changing temperature) can be determined, various leaks within the inflatable can be detected, the pressure can be tracked, and data can be secured.

Pressure, as used herein, generally refers to gas or a substance in an inflatable. Gas pressures of interest in accordance with embodiments of the present disclosure include air, smoke, water, chemicals, as well as mixtures of these and other gas/substance forms.

While previous approaches for testing a pressure use manual gauges to break the seal of the inflatable device, embodiments of the present disclosure can quantitatively test a pressure using a manufactured sensor. For example, a pressure sensor can provide an increased accuracy reading related to the pressure, the reading(s) can be tracked and/or recorded for record keeping purposes, and/or to monitor compliance among users, among other benefits.

The disclosed approach can be performed by any user with an appropriate reader device such as a smartphone enabled with near field communication (NFC). The system can allow for tracking, secured data to prevent data tampering, temperature compensation, and external pressure compensation, with no requirement to break the pressure of the inflatable device.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of pressure sensors" can refer to one or more pressure sensors.

In some embodiments, a pressure sensor can be combined to include a radio frequency identification (RFID) Integrated Circuit (IC) as a identifier. The sensor assembly may provide a unique identifier that can be used, for example, to track (e.g., via a computing system with a database) the condition of the inflatable pressure over time, among other functions. The identifier can be numeric, alphanumeric, identified by one or more symbols, or other suitable identification mechanisms that can allow one to be distinguished from another. This identifier can be used to, for example, track the dates on which a particular inflatable has had its pressure measured, the pressure values on those dates, the owner of the inflatable, and other useful information about the inflatable, as will be discussed in more detail herein.

As discussed above, the sensor can be mounted within the inflatable such that the sensor may assess the air pressure changes (e.g., pressure leakage) inside the inflatable. In some embodiments, the sensor can be molded within the body of the inflatable (e.g., on or near an inside surface of the inflatable). For example, the sensor can be molded into the plastic used to mold the body. In some embodiments, the sensor can be adhesively applied to an inside surface of the inflatable. In some embodiments, a small hole can be formed in the inflatable and the pressure sensor circuit assembly can be used as a patch for that hole. The pressure sensor element on the circuit assembly can be situated directly over the hole to allow pressure measurement.

In some embodiments, the sensor can be a patch adhered to the outside of the inflatable, for example with an adhesive.

The gas pressure inside the inflatable can be routed to the pressure sensor through a small hole in the gas housing wall. The sensor can act as a patch to seal the gas housing from leaking through the hole provided for the pressure sensor. In this way, the sensor can be applied to existing gas housings without substantially changing the housing. Only a small hole needs to be created, which the sensor can patch to prevent excessive leaking. When the sensor is applied, the pressure sensor element should be aligned to the hole to ensure the pressure present at the pressure sensor element is equal to the pressure in the gas housing.

Some sensors that could be used to measure pressure can be cost efficient and/or durable, which in some instances, may sustain the entire life of the inflatable. For example, by being able to quantify the efficacy of the pressure of the inflatable, a user can be able to know when it has become ineffective at holding pressure and that it should be replaced.

In some embodiments, the sensors do not need to be active at all times, but only when pressure testing takes place. As such, these types of sensors can be low power sensors that can, for example, be provided internal to an inflatable, which can harvest power from a power source (e.g., an included battery, an RFID reader field, or other available power source) and provide a pressure output to the user or remote device, such as a reader or computing device, either through a wireless or wired connection.

In a wired connection, the inflatable can include a communication component (e.g., transceiver having a wired connection port) to allow communication to and/or from a reader. In a wireless connection, the inflatable can include a communication component (e.g., wireless transceiver) to allow communication to and/or from reader.

FIG. 1 illustrates a front and back side of a pressure sensor structure according to an embodiment of the present disclosure. The embodiment of FIG. 1 includes an circuit 110 with a number of components thereon including an integrated circuit (IC) 134 that is a microcontroller or other sensing device controller that can provide power to the pressure sensor element 136 (a device that senses pressure and provides pressure data), and communicates with the pressure sensor element to request and/or receive pressure measurements.

The circuit 110 includes a coiled antenna 138 around the perimeter. The coiled antenna can be used to harvest power from other nearby devices and/or transmit and/or receive data with another device such as the reader 230 and/or the computing device 220. Any suitable type or orientation of antenna can be used with respect to the embodiments of the present disclosure wherein the antenna can send and/or receive data and/or instructions from a remote device.

In some embodiments, these and other components can be powered by a power source located within the inflatable (e.g., on the IC 134 or connected thereto). However, as indicated above, in some embodiments, the sensor can function such that a power source may be optional. That is, the sensor and IC 134 can harvest power from an identification reader that is not part of the inflatable (e.g., via antenna 138).

Harvesting power from the identification reader (reader 230) can, for example, include a user approaching and/or holding the test system for the pressure test (e.g., testing for a leak), such that the identification reader may be close enough to provide adequate power for a sensing tag (e.g., pressure sensor or a combined function circuit, such as circuit 110). The identification reader can power the sensor, which can communicate the information to a test functionality (e.g., executable instructions on a computing device or reader, or within the sensor assembly).

With regard to identification of the inflatable, in some embodiments, a sensing tag can be used that can include a unique identifier that may be connected to the inflatable and/or specific to the user for test result tracking. That is, each sensor and/or sensing tag can include a unique identifier so that the tag can identify a particular inflatable associated with a user.

For example, each inflatable can have a different unique identifier and the identifiers can be used to identify one from another. In some embodiments, the functionality of an identifier can be provided by data stored in the IC 134 or sensor 136 and transmitted via the antenna 138 to a remote device that is requesting the information.

In some embodiments, when the pressure test begins, the sensor can measure and/or communicate pressure values to an external test system (e.g. a computing device 222 and/or reader 230). The pressure values can include measured absolute pressure inside the inflatable. One such example, shown as a graphical representation, is provided in FIG. 3.

Figure 2:
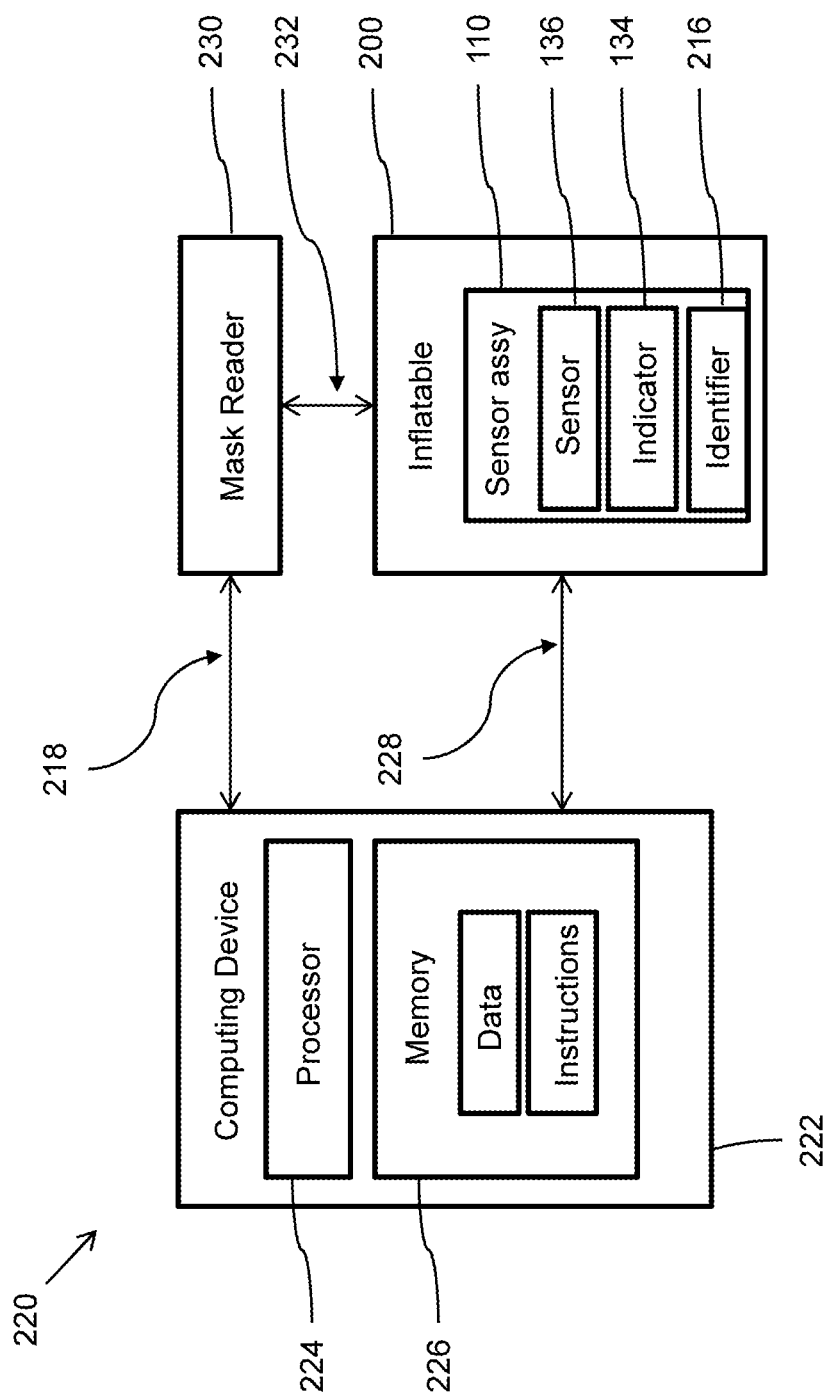
FIG. 2 illustrates a pressure measurement system according to an embodiment of the present disclosure.

FIG. 2 illustrates a pressure measurement system according to an embodiment of the present disclosure. The pressure system 220 in the embodiment of FIG. 2 includes an inflatable 200, a computing device 222, and a reader 230.

The inflatable 200 can be a tire or ball, but could also be another suitable type that would benefit from the pressure sensing techniques discussed herein. Further, although the computing device is shown as a different device to the reader and the inflatable, in some embodiments, the reader can include a computing device and can accomplish the functionalities of the computing device described herein without use of a separate computing device.

The gas sensor assembly (110) can include a pressure sensor element (136) that is exposed to the pressure inside the inflatable and converts this pressure into a sensible value, such as a voltage. The sensor element may be connected to a transceiver (134) that may interpret the sensor element output and communicate the pressure values outside of the inflatable. The identifier may be a separate part or may be included in one of the other sensor assembly components.

The computing device 222 can include a processor 224 and memory 226. The memory 226 can have various types of information including data and executable instructions, as discussed herein.

The processor 224 can execute instructions that are stored on an internal or external non-transitory computer device readable medium (CRM). A non-transitory CRM, as used herein, can include volatile and/or non-volatile memory.

Volatile memory can include memory that depends upon power to store information, such as various types of dynamic random access memory (DRAM), among others. Non-volatile memory can include memory that does not depend upon power to store information.

Memory 226 and/or the processor 224 may be located on the computing device 222 or off of the computing device 222, in some embodiments. In some embodiments, the computing device 222 can include a network interface. Such an interface can allow for processing executable instructions and/or data on another networked computing device, can be used to obtain information about the inflatables, users, or other useful information (e.g., from the manufacturer, site where inflatables are being used, etc.), and/or can be used to obtain data and/or executable instructions for use with various embodiments provided herein.

As discussed above, the computing device 222 can include one or more input and/or output interfaces (e.g., connection to the transceiver). Such interfaces can be used to connect the computing device 222 with one or more input and/or output devices (e.g., inflatable 200 and/or reader 230, via communication links 218 and/or 228).

Other interfaces can include a display device (e.g., a monitor) and/or a printer, among other suitable devices. The input/output interfaces can receive executable instructions and/or data, storable in the data storage device (e.g., memory), representing information about the inflatable, the user, the environment in which the inflatable is being used, etc.

The processor 224 can execute instructions to provide information to a user of the computing device, such as identification and ownership information, projected life span of the inflatable, amount of leakage, comparison of multiple inflatables, and/or historical and/or predictive information based on the data received from the sensor 110.

Such connectivity can allow for the input and/or output of data and/or instructions among other types of information. Some embodiments may be distributed among various computing devices within one or more networks.

As discussed herein, embodiments of the present disclosure can test a pressure using pressure sensors. The pressure sensors can detect the pressure inflatable, which can determine whether a pressure is within a specified range. Utilization of the pressure sensors can provide accuracy when testing a pressure and/or tracking the test results.

The embodiment of FIG. 2 also includes a reader 230. The reader can be used, for example, to interrogate the sensor assembly (110) within the inflatable 200 (via communication link 232) to determine a identifier 216, receive information about the status of the inflatable from an transceiver 134 (e.g., a computing and/or communication device that receives sensor data and determines the status of the pressure), and/or sensor information that can be used by executable instructions to provide analysis and other information such as: ownership information, projected life span of the inflatable, amount of leakage, comparison of multiple inflatables, and/or historical and/or predictive information based on the data received from the sensor assembly 110. The reader can, for example, be a portable device such as a smart phone, or a desktop or mounted device that can be used to communicate information and, in some cases, provide power to the sensor as will be discussed in more detail below.

The received data can, for example, include a sensed pressure at a first point in time with a sensed pressure at a second point in time and the first and second data points are compared to determine a leakage rate and the leakage rate is compared to a threshold leakage rate. In some embodiments, the first and second data points can be compared to determine a leakage rate and the leakage rate is compared to at least one other leakage rate taken during a test at another time period to track the increasing leakage over time.

The status of the inflatable can be evaluated periodically (e.g., at a set day or time of the month, whenever the inflatable is to be used, etc.). The evaluation can be accomplished in various suitable ways. For example, in some embodiments, the evaluation can be based on multiple sets of received data from the inflatable to determine the status of the inflatable.

Another suitable use for the data received is to perform the evaluation based on multiple sets of received data from the inflatable to project a possible failure timeframe for the inflatable. A time, for example, where it may no longer hold pressure for an adequately long time for its intended use. In some embodiments, such an evaluation can be based on multiple sets of received data from the inflatable.

Data sent over the communication links as well as data stored both within the sensor assembly and within the reader and/or computing device can be encrypted or secured so it cannot be tampered with by users. By doing this, any user can securely measure the pressure inside an inflatable device and the measurement can be trusted as an objective standard measurement. The encryption results in a minimal risk of malicious or deliberate data tampering by users or from inadvertent corruption by unwitting users.

Figure 3:
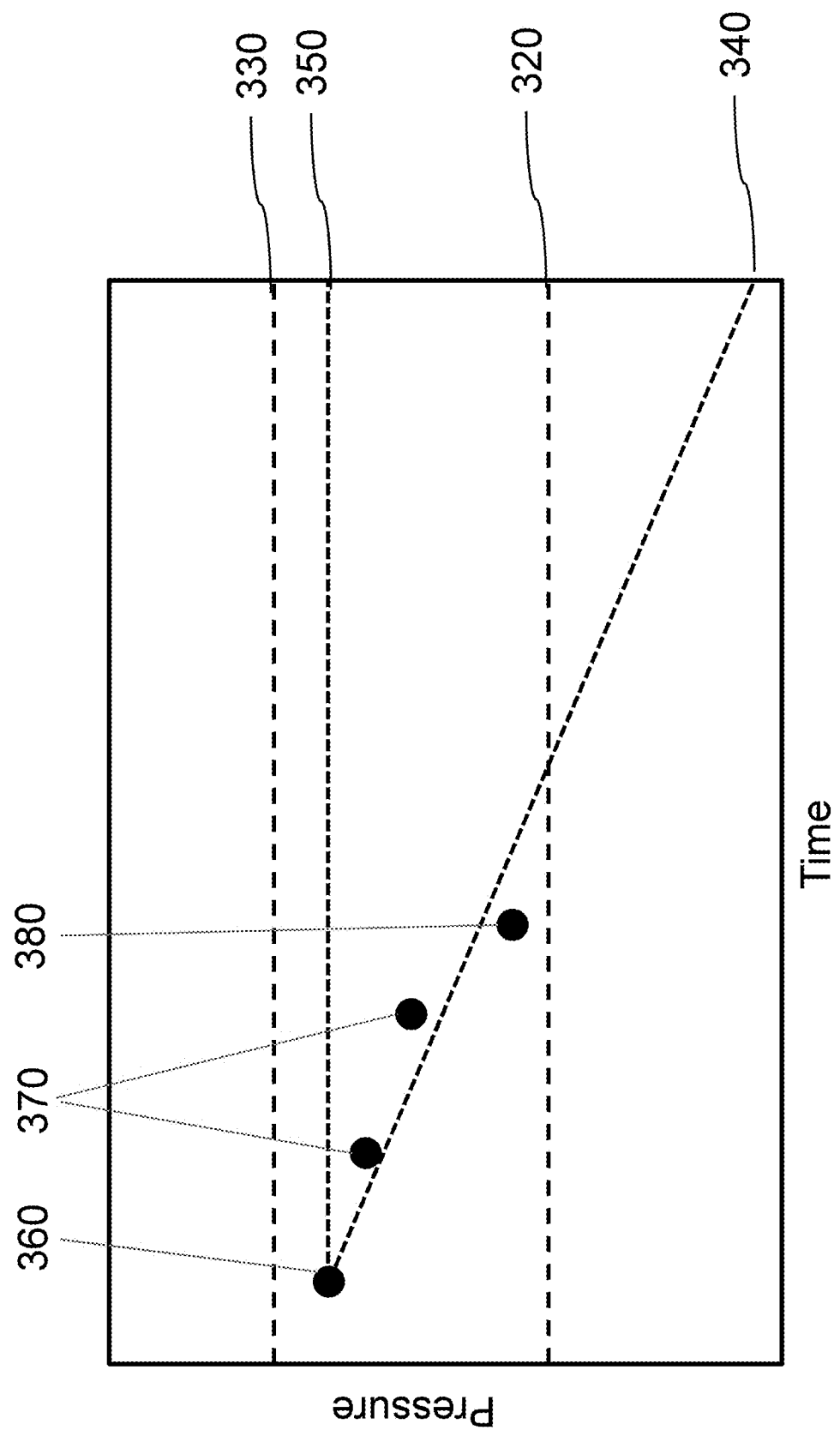
FIG. 3 provides a graph showing pressure and leakage tracking according to embodiments of the present disclosure.

FIG. 3 provides a graph showing acceptable pressure and pressure tracking according to embodiments of the present disclosure. FIG. 3 illustrates aspects of the present disclosure such as the user tests and pressure tracking of an inflatable over time. As the reader understands, the process of testing may differ from that described in FIG. 3 according to other embodiments of the present disclosure.

An external test system can track the pressure of a device against short and long term standards. If either the pressure at the moment of the measurement or the change in pressure over repeated readings spread out over some time is outside of a predetermined range, the pressure test can be deemed a failure, and the user can be notified.

A failure can indicate that the inflatable is not at the correct pressure or is leaking at an unacceptable rate. In some embodiments, the test system can inform the user of the failure via an alert signal. The alert signal can be any stimulus that will get the attention of the user. Examples include audible, visual, tactile or other stimulus types.

In some embodiments, a test system reader can be an Internet-connected reader, such as an identification reader connected to a computing device, via a wired or wireless connection (e.g., universal serial bus (USB)) or a smartphone identification reader using, for example, built in NFC communication technology. The user can bring the inflatable to the reader or the reader to the inflatable, and once the reader is able to receive a signal from the sensor, it can automatically begin the pressure test, or it can require input from the user to begin the test.

The user can be notified of the test results, and can remove the inflatable from the test system and resume use. Notification can include a numerical report of the measured pressure, illumination of a light on the test system, vibrations, buzzers, audio message, other form of sensory notification, or a combination thereof.

If the pressure is not within the acceptable range, or if the leakage over time is determined to be too great, the test can indicate a failure. In some embodiments, the user can be notified of the failing test. The failing test indicates the inflatable may need repair or adjustment prior to use.

In some embodiments, the test data can be sent to a local or network connected (e.g., via the Internet) database of pressure test results for each inflatable.

FIG. 3 illustrates a result wherein the leakage rate was too great even though the measured pressure was within specified limits. This result might fail a leakage test but pass a pressure test. There are several features that may be included in such a test, whether they are explicitly indicated in the test result or not. FIG. 3 shows a graphical representation of four pressure tests over time. The graph shows an upper absolute pressure limit 330 indicating the maximum allowable pressure for the inflatable. The graph also has a lower absolute pressure limit 320 indicating the minimum allowable inflatable pressure. FIG. 3 includes leakage limits.

In some embodiments, the leakage limits may be based on the original pressure measurement. In some embodiments the leakage limits may be based on an acceptable leakage over time. FIG. 3 shows a maximum allowable leakage 340 that shows a minimum pressure that is allowed versus time. An initial pressure measurement 360 is taken as the first point in FIG. 3. That measurement was within the absolute pressure limits of 320 and 340 and also sets the maximum and minimum leakage limits (350 and 340, respectively). In FIG. 3, the maximum leakage limit is time-based and linearly dependent on time. The minimum leakage limit in FIG. 3 is based on zero leakage from the first pressure measurement. The assumption in this case is that the pressure will not increase over time.

Other test points 370 are shown as being measured over time and were within both the absolute pressure limits and the leakage limits. A final test point 380 is shown as being within the absolute pressure limits but outside of the leakage limits. In this case, point 380 has leakage that is too great, and it has failed the leakage test, even though the absolute pressure is within range. The system may allow the user to disregard the leakage failure.

Figure 4:
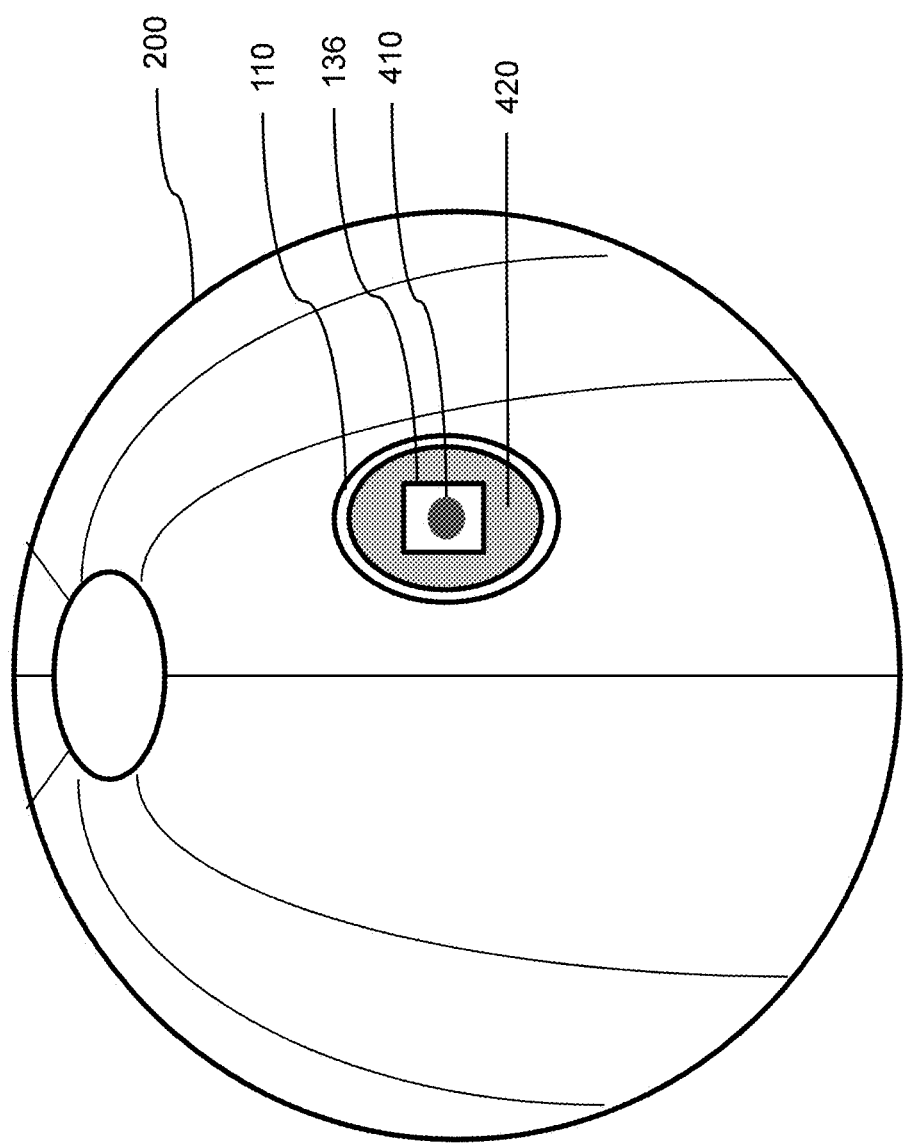
FIG. 4 shows a pressure sensor patch that can be applied to an existing gas housing with minor modification.

FIG. 4 illustrates a sensor assembly 110 configured as a patch. The inflatable 200 has a hole 410 in its outer surface over which the pressure sensor element 136 is placed. The pressure sensor element is then exposed to the pressure inside of the inflatable, even though it is applied outside the inflatable. The pressure sensor assembly can act as an adhesive patch in this example, patching the hole from leaking out additional pressure. Adhesive 420 can be applied directly to the patch to seal the hole. In this way, the pressure sensor is easily added to an existing inflatable. In one embodiment a user creates a small hole in an inflatable and the sensor assembly 110 is placed over the hole to expose the pressure element 136 to the pressure inside the inflatable 200. The sensor assembly 110 is held by adhesive 420 and completely patches the hole from leaking.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above values and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An apparatus, comprising:
   a body having a gas housing portion that maintains a gas pressure; and
   a sensor assembly for measuring the pressure within the gas housing portion that wirelessly communicates to an external reader device; wherein
   the sensor assembly obtains all necessary power from the external reader device; and
   wherein the sensor assembly is attached to an exterior of the gas housing portion of the body with an adhesive and the sensor assembly further includes a pressure sensor element that is exposed to the gas pressure maintained in the gas housing portion through a hole in a wall of the gas housing portion.

2. The apparatus of claim 1, wherein the sensor assembly is configured to wirelessly communicate to the external reader device with a wireless communication protocol that is one of radio frequency identification (RFID) or near-field communication (NFC).

3. The apparatus of claim 1 wherein the sensor assembly forms a patch that substantially prevents gas leakage through the hole formed for the pressure sensor element.

4. The apparatus of claim 1 wherein the sensor assembly is configured to wirelessly communicate to the external reader device and the wireless communication is encrypted.

5. A system for testing a pressure, comprising:
   a gas housing portion that maintains a gas pressure;
   a sensor assembly for measuring the pressure within the gas housing portion; and
   a wireless external reader device external to the gas housing portion that is configured to provide power to and communicate with to receive communicated data from the sensor assembly;
   wherein the sensor assembly is attached to an exterior of the gas housing portion with an adhesive and the sensor assembly further includes a pressure sensor element that is exposed to the gas pressure maintained in the gas housing portion through a hole in a wall of the gas housing portion.

6. The system of claim 5, wherein the external reader device includes a processor and the communicated data includes a sensed pressure wherein the processor is configured to compare the sensed pressure to a reference pressure range.

7. The system of claim 5, wherein the external reader device includes a processor and the communicated data includes a sensed pressure at a first point in time and a sensed pressure at a second point in time wherein the processor is configured to compare the first and second data points to determine a leakage rate and the processor is further configured to compare the leakage rate to a leakage rate limit.

8. The system of claim 5, wherein the external reader device includes a processor and the communicated data includes a sensed pressure at a first point in time and a sensed pressure at a second point in time wherein the processor is configure to compare the first and second data points to determine a leakage rate and the processor is further configured to compare the leakage rate to at least one other leakage rate taken during a test at another time period.

9. The system of claim 5, wherein the external reader device includes a processor and a memory and the communicated data is pressure data and the pressure data is stored in the memory wherein the processor is configured to periodically evaluate a status of the gas housing portion based on multiple sets of the pressure data.

10. The system of claim 5 wherein the external reader device is a smartphone.

11. The system of claim 5 wherein the external reader device is configured to obtain an external ambient pressure outside of the gas housing in order to provide a gauge pressure reading.

12. The system of claim 5 wherein the external reader device determines a local ambient pressure based on location information obtained by the external reader device and/or information obtained through a communications network.

13. The system of claim 12 wherein the communications network is the internet.

14. A method for testing a pressure, the method comprising:
measuring, with a sensor assembly, a pressure within a portion of a gas housing;
communicating, between the sensor assembly and an external reader, the measured pressure; and
obtaining for the sensor assembly, all necessary power from the external reader device, and wherein the sensor assembly is attached to an exterior of the gas housing portion with an adhesive and the sensor assembly further includes a pressure sensor element that is exposed to the gas pressure maintained in the gas housing portion through a hole in a wall of the gas housing portion.

15. The method of claim 14 wherein the external reader is a smartphone.

16. The method of claim 14 wherein the sensor assembly is configured to wirelessly communicate to the external reader device with a wireless communication protocol that is one of radio frequency identification (RFID) or near-field communication (NFC).

* * * * *